United States Patent
Plettrichs et al.

(10) Patent No.: US 7,963,580 B2
(45) Date of Patent: Jun. 21, 2011

(54) CARGO SPACE COVER FOR A MOTOR VEHICLE

(75) Inventors: Ulf Plettrichs, Dillishausen (DE); Jürgen Klingenberg, Neuried (DE); Fritz Wegener, Gilching (DE); Peter Biecker, Oberhaching (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 11/909,814

(22) PCT Filed: Mar. 29, 2006

(86) PCT No.: PCT/DE2006/000559
§ 371 (c)(1), (2), (4) Date: Jun. 24, 2008

(87) PCT Pub. No.: WO2006/102879
PCT Pub. Date: Oct. 5, 2006

(65) Prior Publication Data
US 2009/0115216 A1    May 7, 2009

(30) Foreign Application Priority Data
Mar. 31, 2005    (DE) .......................... 10 2005 014 798

(51) Int. Cl.
*B60R 5/04* (2006.01)
(52) U.S. Cl. ...................................... 296/37.16; 296/96
(58) Field of Classification Search ............. 296/136.01, 296/136.04, 136.1, 76, 37.16, 37.8, 98; 160/23.1, 160/24, 30, 370.22
See application file for complete search history.

(56) References Cited

U.S. PATENT DOCUMENTS

| | | | | |
|---|---|---|---|---|
| 3,909,060 A | * | 9/1975 | Katayama | 296/37.16 |
| 4,139,231 A | * | 2/1979 | Lang et al. | 296/37.16 |

(Continued)

FOREIGN PATENT DOCUMENTS

DE    2733165    2/1979

(Continued)

*Primary Examiner* — Glenn Dayoan
*Assistant Examiner* — SunSurraye Westbrook
(74) *Attorney, Agent, or Firm* — Fitch, Even, Tabin & Flannery; John Naber

(57) ABSTRACT

The invention relates to a device for covering a cargo space (12) of a motor vehicle, said cargo space being bordered by an outwardly pivotable vehicle lid (14), in particular a trunk lid, said device comprising an extractable roller blind device (26, 22, 24) which can be driven at least in the retraction direction and which forms a roller blind web (22) which extends over an area in its extracted state between a first end (26) of the roller blind and a second end (24) of the roller blind, and first and second positioning means (32, 34, 31) arranged in the vehicle for positioning the first and/or second ends (26, 24) of the roller blind(s) by means of which the roller blind web (22) can be extracted into a covering position in which the roller blind web (22) extends essentially horizontally over the cargo space (12). To be able to bring the roller blind web easily out of the covering position into a position that facilitates access to the cargo space, according to the present invention, the first positioning means (32, 34) are arranged separately from the vehicle lid (14) and the second positioning means (31) are arranged on the vehicle lid (14) so that the second end (24) of the roller blind is jointly pivotable due to the outward pivoting (A) of the vehicle lid (14) to bring the roller blind web (22) out of the covering position and into an inclined position.

14 Claims, 2 Drawing Sheets

U.S. PATENT DOCUMENTS

Figure 1:
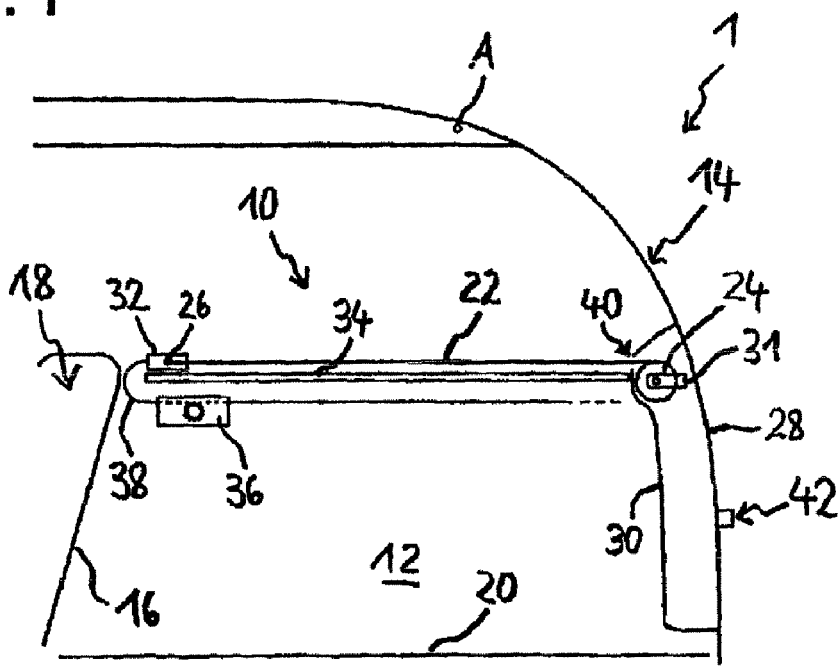

| | | | | |
|---|---|---|---|---|
| 4,222,600 A | * | 9/1980 | Cripps et al. | 296/37.1 |
| 4,222,601 A | * | 9/1980 | White et al. | 296/37.16 |
| 4,289,345 A | * | 9/1981 | Tamamushi et al. | 296/37.16 |
| 4,502,674 A | * | 3/1985 | White et al. | 296/37.16 |
| 5,011,208 A | * | 4/1991 | Lewallen | 296/37.16 |
| 6,099,222 A | * | 8/2000 | Moore | 410/100 |
| 6,486,631 B2 | * | 11/2002 | Schlecht et al. | 318/445 |

FOREIGN PATENT DOCUMENTS

| | | |
|---|---|---|
| DE | 19533806 | 3/1996 |
| DE | 19706355 | 1/1998 |
| DE | 29716037 | 1/1999 |
| DE | 10324289 | 12/2004 |
| EP | 1616756 | 1/2006 |

* cited by examiner

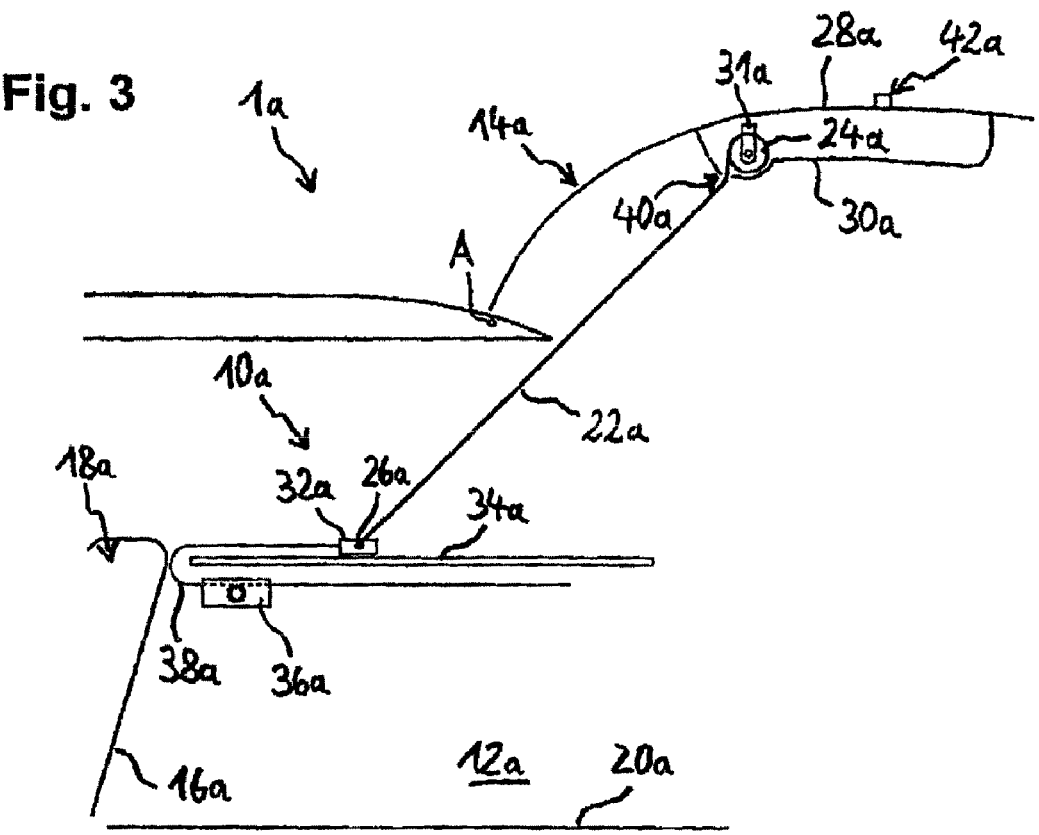
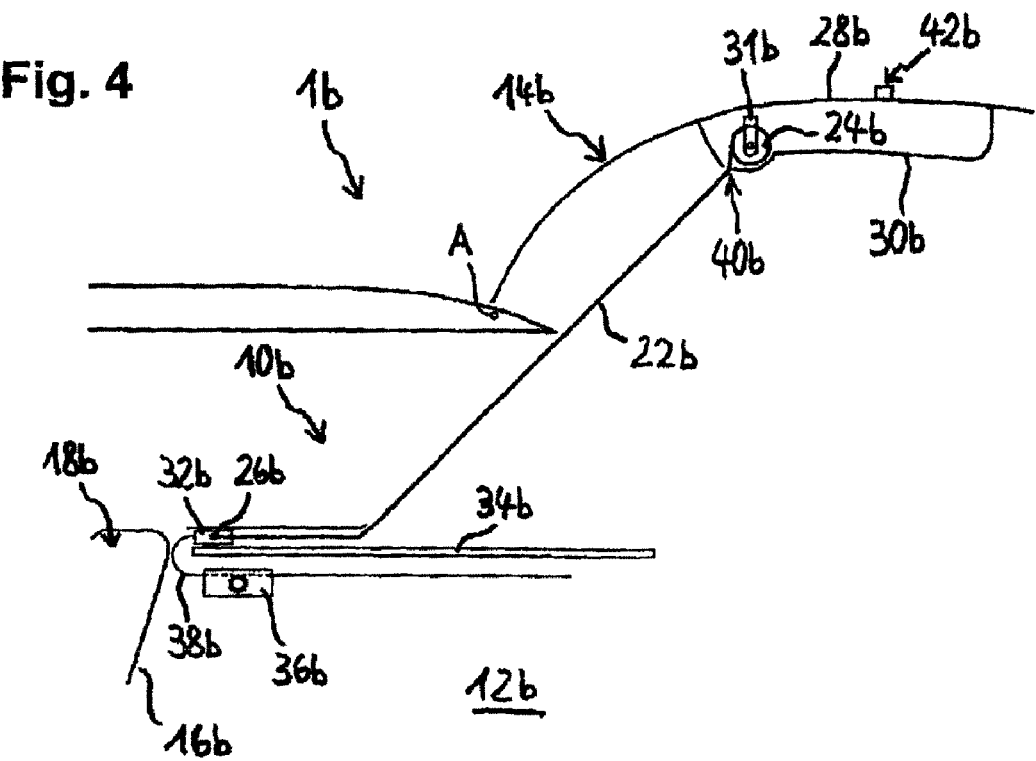

CARGO SPACE COVER FOR A MOTOR VEHICLE

This application is a 35 U.S.C. §371 National Stage entry of PCT/DE2006/000559, filed Mar. 29, 2006, which claims priority from German Patent Application No.: DE 10 2005 014 798.4, filed Mar. 31, 2005, the contents of which are herein incorporated by reference.

The present invention relates to a device for covering the cargo space, i.e., luggage compartment, of a vehicle, which is bordered by an outwardly pivotable vehicle lid, in particular a trunk lid.

The invention relates in particular to such a cargo space cover device having a roller blind device that is drivable, at least in the retraction direction, and can be extracted so that it forms a roller blind web extending over an area between a first end of the roller blind and a second end of the roller blind in its extracted state and having first and second positioning means arranged in the vehicle for positioning the first and/or second ends of the roller blind by means of which the roller blind web can be extracted into a covering position, in which said roller blind web extends essentially horizontally over the cargo space.

Such a device is known from DE 198 47 787 A1, for example. This known cargo space cover comprises a roller blind device having a roller blind web extending horizontally over the cargo space in a covering position. The roller blind web is formed in two parts comprising a right sheeting part and a left sheeting part. The front end of the roller blind (free ends of the two roller blind web parts) is formed by a front edge area of the roller blind web and is positioned directly behind the back seats of the vehicle, where it is fixedly secured on the vehicle. The rear end of the roller blind is formed by two winding shafts for rolling up the roller blind web part, the winding shafts being arranged so they are parallel to one another, each being rotatable in a joint receptacle holder. Each winding shaft has a motor drive, e.g., a spring drive, so that the two roller blind web parts can be extracted or rolled up against the torque of the motor drive. The cargo space cover is operated manually by displacement of the receptacle holder, which engages with lateral end pieces in guide rails that run horizontally, thereby positioning the rear end of the roller blind.

Such a device is also known from DE 103 24 289 A1. This known cargo space cover comprises a roller blind device having a roller blind web that is adjustable between a first protective position in which it is pulled out approximately horizontally and a second protective position in which it is pulled out approximately vertically. In the first protective position, the extracted roller blind web extends horizontally over the cargo space. The rear end of the roller blind is held in lateral guide rails having a first section that rises obliquely, starting from the rear end of the cargo space, and a section that extends forward along a roof frame section. To bring the roller blind web out of the horizontal covering position into a position that simplifies access to the cargo space, either the rear end of the roller blind must first be separated from the guide rails and the roller blind must be retracted or the rear end of the roller blind must be displaced along the guide rails.

The object of the present invention is to provide a cargo space cover device of the type defined in the introduction such that it can be brought easily out of the covering position and into a position facilitating access to the cargo space.

This object is achieved by a device according to claim 1. The dependent claims relate to advantageous further embodiments of the invention.

The inventive device is characterized in that the first positioning means are arranged separately from the vehicle lid and the second positioning means are arranged on the vehicle lid, where the second end of the roller blind is jointly pivotable by the outward pivoting of the vehicle lid to bring the roller blind web out of the covering position into an oblique position.

With the inventive device, it is possible that the second end of the roller blind is also pivoted by the outward pivoting of the vehicle lid and thus this end of the roller blind, which is also referred to below as being "near the [trunk] lid" is moved in such a way that the roller blind web running between the two positioning means is positioned obliquely. This oblique position of the roller blind web then greatly facilitates access to the cargo space and may be accomplished "automatically" to a certain extent when opening the vehicle lid.

If the pivoting of the vehicle lid constitutes simple rotation (without translation), i.e., it takes place as rotation about a fixed pivot axis, then the plane of extent of the roller blind web in its covering position is preferably parallel to this pivot axis. In the case of a pivoting motion of the vehicle lid comprised of rotation plus translation, the plane of extent of the roller blind web may also run parallel to a pivot axis corresponding to the rotation component. This yields generally favorable kinematics of the oblique position.

With compact cars, station wagons and many other conventional types of vehicles (e.g., so-called vans, SUVs, etc.), a cargo space is bordered by an outwardly and upwardly pivotable trunk lid or hatchback, where a pivot axis corresponding to the outward pivoting movement runs horizontally in the transverse direction of the vehicle in a rear roof area of the vehicle.

With these vehicles, which are of particular interest for use with the present invention, it is preferable if the plane of extent of the roller blind web in the covering position also runs approximately horizontally when extended in the longitudinal and transverse directions of the vehicle.

A vehicle lid pivot axis provided parallel to the plane of extent of the roller blind web in the covering position preferably runs at a distance above this roller blind plane of extent, which is of the same order of magnitude as the distance of the cargo space floor beneath this plane of extent. For example, in one embodiment, the distance mentioned first is in the range of 50% to 150% of the distance mentioned second.

In one embodiment, the two ends of the roller blind have a common direction of extent, this direction of extent running parallel to a pivot axis about which the vehicle lid is pivoted. With the vehicles mentioned above, which are equipped with a trunk lid bordering the cargo space, the common direction of extent of the ends of the roller blind thus preferably extends horizontally in the transverse direction of the vehicle.

Means for holding the vehicle lid in its outwardly pivoted position are preferably provided. Such means, e.g., in the form of hydraulic spring elements, are usually provided anyway (at least in the case of vehicle trunk lids) to facilitate loading and unloading of the cargo space, but under some circumstances (e.g., in the case of a prestress due to the end of the roller blind acting thereon in the pivoting direction) their dimensions may optionally be adapted with regard to their holding power within the scope of the present invention. A load on the outwardly pivoted vehicle lid in the closing direction occurs, for example, for the preferred embodiment within the scope of the present invention, wherein the drive provided for retracting the roller blind device, functions as a retrieval assembly, in particular a spring drive that always tries to retract the roller blind web. For the design of such retrieval devices and/or spring drives, it is possible to rely on known designs from the field of roller blind devices.

In one embodiment, at least one of the two ends of the roller blind web is attached to a rotatably mounted winding shaft assigned to this end, so that its rotation allows the roller blind web, which is provided in general as a rollable sheeting (e.g., textile web, a series of slats, etc.) to be wound up onto the winding shaft ("roller blind roll"). Those skilled in the art are familiar with such winding shaft mechanisms, in particular those with an integrated spring drive which prestresses the winding shaft in the direction of rolling up the blind (retraction of the roller blind mechanism), so these do not require further explanation here.

Within the scope of the present invention, preferably only one of the two ends of the roller blind is formed by a rotatably mounted roller blind shaft. The other end then preferably has a transverse reinforcing part such as a tension bar and/or is formed by such a part.

The first positioning means for positioning the first end of the roller blind may be arranged, e.g., on the end of the cargo space opposite the vehicle lid at a distance from the cargo space bottom, e.g., as holders fixedly mounted on the vehicle to which lateral end pieces of the first end of the roller blind can be fixedly or releasably secured. The lateral end pieces may be formed here, e.g., by lateral end sections of a flexurally rigid transverse reinforcement such as a tension bar. As an alternative, the end pieces may be, for example, bearing journals protruding laterally away from a winding shaft housing (or the lateral end pieces of the winding shaft itself, which are then positioned so they are rotatably mounted by the first positioning means). The first positioning means, also referred to below as "remote from the lid," may be designed, for example, so that the first end of the roller blind can be positioned fixedly on the end of the cargo space remote from the lid. In the case of a cargo space bordered by a trunk lid, this position of the end of the roller blind may be provided on the back side of the passenger seat row farthest to the rear in the vehicle.

In a further embodiment, the first positioning means are designed as guidance means for guiding the first end of the roller blind in relation to the second end of the roller blind (near the lid), e.g., comprising guide rails extending in a longitudinal direction for longitudinally transportable accommodation of the lateral end pieces of the first end of the roller blind. In the case of a vehicle provided with a trunk lid of the type mentioned in the introduction, for example, this yields the advantage that by displacement of the front end of the roller blind toward the rear directly behind a rear row of seats in the vehicle, an access opening is formed through which items needed during the trip, for example, may be removed from the cargo space over the rear seats.

The longitudinal transportability of the end of the roller blind web at a distance from the lid may be accomplished manually or with a motor drive. The latter may be implemented, for example, by having the first positioning means and/or guide means comprised longitudinally drivable carriages which run in or on guide rails running on both sides of the extended roller blind web. Such carriages may be driven by a drive mechanism, for example, comprising a drive motor with two synchronously drivable drive cables that act on the carriages. The carriages may have, for example, sliding or rolling elements held in a form-fitting manner in an inside profile of the guide rails.

By means of a motor drive of the above-mentioned carriages, the end of the roller blind remote from the lid may be displaced very conveniently, e.g., to and from the vehicle lid in a horizontal direction.

In a preferred embodiment, the second positioning means arranged on the vehicle lid allow positioning of the second end of the roller blind (near the lid) directly in or on the vehicle lid. Displaceability of this end of the roller blind, in particular away from the vehicle lid into the interior of the vehicle in a horizontal direction is not generally necessary because access to the cargo space from this side would occur in practice only after a previous outward pivoting of the vehicle lid and according to the present invention the roller blind web could then be brought into its inclined position anyway, further simplifying the access. In a preferred embodiment because of its simple design, it is therefore provided that the second positioning means shall position the second end of the roller blind fixedly or detachably in a fixed position with respect to the vehicle lid.

In an especially suitable embodiment for this purpose, the second positioning means are integrated into the vehicle lid. The positioning means here (like the first positioning means) may be provided by simple holders for lateral end pieces of the end of the roller blind, e.g., in the form of holders which hold a flexurally stiff transverse reinforcement of the roller blind web protruding through a slot into the interior of the vehicle lid. In an alternative that is especially preferred for trunk lids, the second end of the roller blind is formed by a winding shaft mechanism in which the end of the roller blind is secured to a rotatably mounted winding shaft onto which the flap-like roller blind web area is more or less wound up. Holders for such a roller blind winding may be provided, e.g., as rotational bearings for winding shaft ends or as bearing for a roller blind winding housing in which a winding shaft is rotatably mounted.

In one embodiment, the second positioning means, e.g., holders for a winding shaft housing that extends horizontally in the transverse direction of the vehicle, arranged between an outer skin and an inside panel of the vehicle lid.

If the first positioning means (at a distance from the lid) comprise guide rails extending in a longitudinal direction, as already mentioned above, to accommodate lateral end pieces of the first end of the roller blind, so that they are longitudinally transportable, in which case the guide rails may each be provided with a carriage, for example, that can be driven by the driver cable acting on it so that it is longitudinally transportable and to which the lateral end pieces of the first end of the roller blind are connected, then according to a first embodiment it is possible to provide for the guide rails to be designed over a portion of their extent in the longitudinal direction, which is preferably at a distance from the vehicle lid, to guide lateral edges of the roller blind web (i.e., to hold them in a constrained manner in a plane spanned by the guides in this area).

Lateral roller blind guides are essentially known and may be used, for example, to exert a certain tensile stress in the transverse direction on a roller blind web that does not have flexural rigidity (e.g., a simple textile web) and/or to reduce fluttering movements of such a roller blind.

With the inventive covering device it is advantageous if a part of the guide rails, which is at a distance from the vehicle lid, guides the lateral roller blind web edges, i.e., holds them in the plane spanned by the guide rails, because the inclined position of the roller blind web which is provided according to the present invention pertains only to that section of the roller blind web which is not guided laterally (unless the guides are also pivoted themselves). With respect to the most possible "effective" inclined position of the roller blind web in opening the vehicle lid in which the incline position allows access to the cargo space through the opened trunk lid in the most convenient possible manner, it is often expedient within the context of the present invention to entirely omit any mentionable extensive guidance of the lateral roller blind web edges in the longitudinal direction.

In the embodiment mentioned above in which the first positioning means are designed as guide means and comprise guide rails extending in the longitudinal direction, for example, it is provided according to a further embodiment that the lateral edges of the roller blind web shall extend over at least a part of their longitudinal extent due to these guidance means, in particular over a large portion of their longitudinal extent or over their entire longitudinal extent are supported on their underside. For this support of the underside of the roller blind web, the guide means, e.g., guide rails, may have a corresponding protrusion directed toward the center of the roller blind web on which the lateral edges of the roller blind web rest. Thus, fluttering or sagging of the roller blind web can be prevented at least partially without thereby hindering the oblique positioning of the roller blind web due to this strictly lower support.

Also with regard to the most effective possible oblique positioning of the roller blind, in one embodiment which allows a motor variable positioning of the first end of the roller blind it is preferable that in opening the vehicle lid, the first end of the roller blind is automatically displaced in the direction away from the trunk lid (unless it is already in a position relatively remote from the trunk lid, in particular in the guidance end position).

Figure 2:
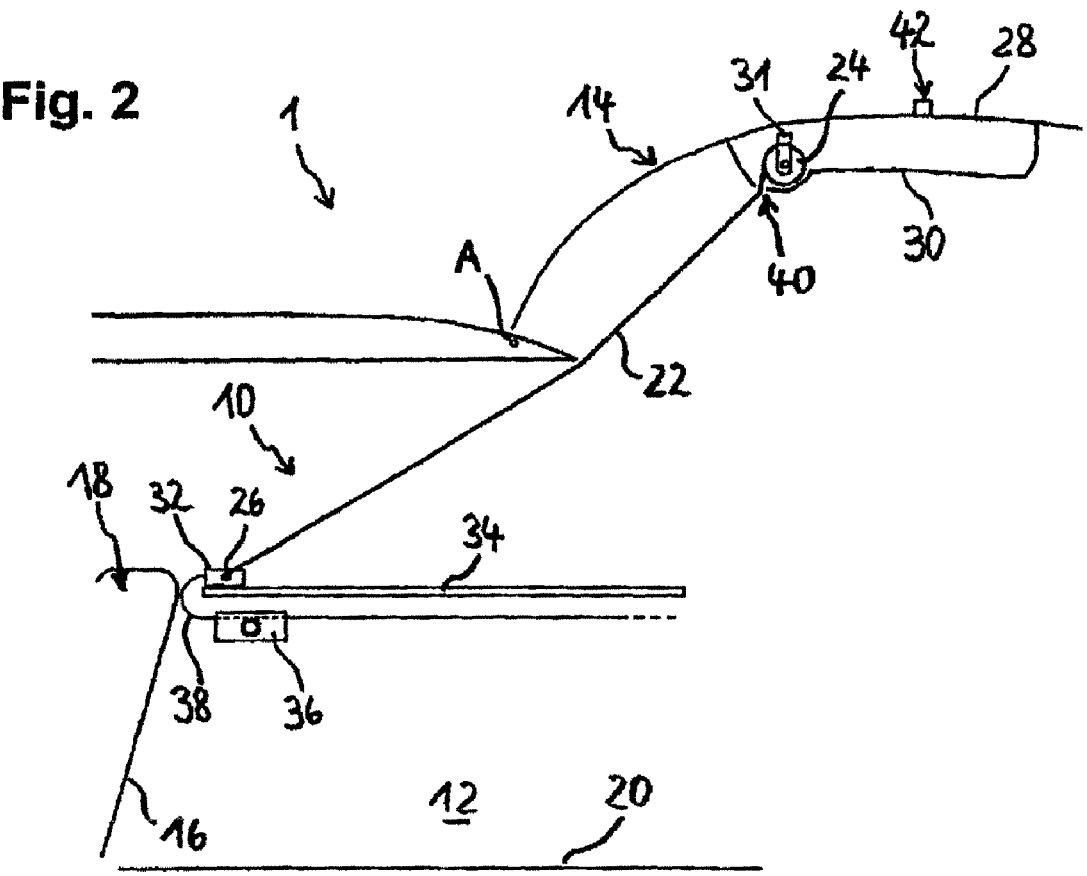

This invention will now be described in greater detail on the basis of a few exemplary embodiments with reference to the accompanying drawings, in which schematically:

FIG. 1 shows a side view of the trunk area of a motor vehicle equipped with a cargo space cover device, illustrating a roller blind web of the device in its covering position, FIG. 2 shows a view corresponding to that in FIG. 1, where the roller blind web is shown in an oblique position resulting from the situation illustrated in FIG. 1 after opening the trunk lid, FIG. 3 shows a view corresponding to that in FIG. 2 according to an embodiment of the cover device using a modified control method, and FIG. 4 shows a view corresponding to that in FIG. 2 of yet another embodiment of the cover device.

FIG. 1 shows a device 10, which is provided in the rear end 1 of a station wagon for covering the cargo space 12 of the vehicle, said cargo space being bordered toward the rear by a trunk lid 14. To open the trunk lid 14 it may be pivoted outward and upward.

The cargo space 12 is also bordered toward the front by a back side 16 of the row of passenger seats 18 farthest to the rear in the vehicle and at the bottom by a cargo space bottom 20.

In the situation depicted in FIG. 1, the cargo space 12 is covered at the top by a roller blind web 22 which extends when extended over a surface area toward the front in the longitudinal direction of the vehicle up to a tension bar 26 when unrolled approximately half way from a rotatably mounted roller blind roll 24.

In the example shown here the tension bar 26 which is situated at the front edge of the roller blind web 22 forms one end of the roller blind which is remote from the trunk lid, hereinafter also referred to as the first end of the roller blind.

The roller blind roll 24 on the other hand forms an end of the roller blind web 22 which is also referred to below as the second end of the roller blind and is arranged horizontally in the transverse direction of the vehicle like the tension 26, namely being rotatably mounted between an outer skin 28 and an inside panel 30 of the trunk lid 14 so that it is integrated into the latter.

At the center of the roller blind roll 24 there is a rotatably mounted winding shaft (not shown) which is preloaded in the winding direction by a spring drive so that the roller blind web 22 is held at tension by the action of the spring drive in the longitudinal direction. Lateral end pieces of the roller blind roll 24 on both sides of the roller blind web 22 are arranged here in a stationary position (but rotatably) within the trunk lid 14 by lateral rotational bearings and/or holders 31.

The first end of the roller blind formed by the tension bar 26 is positioned so that it can be displaced in the direction of the trunk lid 14 and away from it in the longitudinal direction of the vehicle in the exemplary embodiment illustrated here. To this end, lateral end pieces of the tension bar 26 which protrude beyond the lateral edges of the roller blind web 22 when seen in the transverse direction are each connected to one of two carriages 32 mounted on both sides of the roller blind web, each carriage being drivable in synchronization along one of two guide rails 34 arranged in parallel in the longitudinal direction of the vehicle.

In the schematic view in FIG. 1, a few components of the device 10 having the same effect which are actually arranged on both sides of the vehicle, e.g., the carriages 32 and the guide rails 34, are shown only once. The device 10 is designed to be essentially symmetrical on both sides of the center of the vehicle. In deviation from the schematic diagram, the carriages 32 preferably slide in a known manner in the guide rails 34, which are designed as profiled rails, for example (e.g., with a C-shaped cross section that is open toward the inside).

Reference numeral 36 denotes an electric motor drive for longitudinal movement of the carriage 32 which is slidingly mounted in the guide rail 34. With this drive 36 to drive cables 38 that have compressive rigidity, each cable being connected to one of the two carriages 32, are moved in synchronization (only one such drive cable 38 is illustrated in the figure). In the example shown here, positioning and/or guide means (assembly) for positioning the tension bar 26 are formed by the guide rails 34, the carriages 32, the drive cable 38 and the controllable drive 36.

In the situation illustrated in FIG. 1, the carriages 32 are moved into a front end position directly behind the row of seats 18 in the vehicle so that the roller blind web 22 completely covers the cargo space (completely closed condition of the cargo space cover).

Starting from this covering position of the roller blind web 22, the tension bar 26 may be moved in the direction of the trunk lid while driving in order to provide access to the cargo space 12 beyond the row of seats 18.

The cover can then be closed again by a corresponding displacement of the tension bar toward the front. If the tension bar 26 strikes an obstacle at the front in this movement, e.g., because the cargo in the cargo space 12 is too voluminous, this can be detected easily, e.g., by monitoring the engine rpm or the engine power consumption by the drive 36. In this case the drive 36 can be stopped immediately. In addition, it is also possible to provide for the drive 36 to then be controlled briefly in the opposite direction in order to move the carriage 32 a distance farther back (e.g., a few cm). As an alternative or in addition to the measure of detecting any obstacle and stopping the carriage drive, if necessary, it is also possible to provide for the coupling of the tension bar and/or the lateral end pieces to the carriage 32 to be detachable during operation by exceeding a predetermined load limit (e.g., by a lock that can be overcome).

Suitable operating means of the cargo space cover may be provided, for example, as operating elements that can be reached easily by occupants in the interior of the vehicle, e.g., as separate operating elements and/or operating functionalities of a so-called on-board computer.

It is also conceivable to initiate the above-mentioned displacement of the carriages 32 by remote control, e.g., by a corresponding design of a remote control device that is provided anyway for central locking and/or central unlocking.

In particular when the row of seats 18 is removed from the rear end area 1 of the vehicle shown here, e.g., to enlarge the cargo space 12 or it can be pivoted downward and/or the vehicle may be suitable for loading the cargo space 12 through side doors in the vehicle, for example, for such access, which should be as unhindered as possible, to the cargo space 12, it is accordingly preferable if the front positioning means and/or the controlling means for controlling the drive 36 are designed for releasing the tension bar 26 from the carriages 32 and/or displacing the tension bar 26, e.g., up to directly in front of the inside panel 32 of the trunk lid 14. The latter presupposes, as in FIG. 1 that the guide rails 34 extend toward the rear until directly in front of a slot-shaped opening 40 in the inside panel 30. If the front end of the roller blind can be uncoupled from the carriages, then the guide rails are preferably designed at their rear end so that the tension bar can be displaced out of same (e.g., so as not to use the cargo space cover temporarily).

As an alternative to the embodiment shown here, the tension bar 26 forming the front end of the roller blind may also be held fixedly on the vehicle so it is not displaceable directly behind the row of seats 18 but then is preferably manually removable from corresponding holders.

Since the front positioning means for the tension bar 26 are arranged separately from the vehicle lid 14 and the rear positioning means (assembly) 31 for the roller blind roll 24 are arranged on the vehicle lid 14, the roller blind roll 24 can be pivoted upward and outward together with the trunk lid 14 out of the position illustrated here in the outward pivoting of the trunk lid 14 about a pivot axis A running in the transverse direction of the vehicle in the roof area. The additional length of the roller blind web 22 required in this case between the tension bar 26 and the roller blind roll 24 is already available in the roller blind roll 24 when the trunk lid is closed. This additional roller blind web length which is kept on hand as a "reserve" so to speak is unwound from the winding shaft in opening the trunk lid 4 (overcoming the spring drive torque).

FIG. 2 illustrates the condition after opening, i.e., outward pivoting of the trunk lid 14 in which the roller blind web is moved out of the covering position according to FIG. 1 into an oblique position, entraining the roller blind roll 24, while at the same time lengthening the roller blind web stretched between the roller blind roll 24 and the tension bar 26. In this situation the cargo space 12 is freely accessible from the rear through the trunk opening which is exposed by the trunk lid 14.

In the embodiment illustrated here, the course of the obliquely positioned roller blind seating 22 is bent, i.e., deflected on a rear roof edge as illustrated in FIG. 2. This may be utilized on the one hand for improved accessibility of the cargo space 12 but on the other hand it also makes certain demands of the design of this roof edge and/or the roller blind web 22. This design, which is suitable for deflection, is accepted in the embodiment shown here in favor of the most effect possible oblique position of the roller blind web 22. As soon as the trunk lid 14 is opened, the carriages 32 are moved automatically into the front end position shown here. This automatic positioning of the carriages 32 may be initiated for example by unlocking and/or actuation of a lock mechanism 42 on the outside of the trunk lid 14 if the carriages 32 are not yet in this end position.

Due to the forced oblique positioning of the roller blind web 22 described here when opening the trunk lid 14, it is advantageously ensured that the cargo space cover 10 will not be obstructed in loading the cargo space 12 (even with especially large items of cargo). It is not necessary to remove the roller blind mechanism, nor is that intended here. In the embodiment shown here, however, the tension bar 26 can be released manually from the front positioning means so that the roller blind web 22 is brought together practically completely and compactly in the roller blind roll 24 by the spring drive of the roller blind roll 24. The tension bar 26 is then directly in front of the outlet slot 40 of the trunk panel 30, so that lateral end pieces of the tension bar 26 come to rest against the side edges of the slot 40.

When the trunk lid 14 is closed again from the position shown in FIG. 2, the roller blind web 22 goes back out of the inclined position into the covering position according to FIG. 1, wherein the required shortening of the roller blind web here is accomplished by driving the roller blind roll 24, implemented here by a spring drive.

In the following description of additional embodiments, the same reference numerals are used for similar components, supplemented in each case by a lower case letter to differentiate the specific embodiment. Essentially only the differences in comparison with the embodiment(s) already described will be discussed in each case and moreover reference is herewith made explicitly to the description of preceding embodiments.

FIG. 3 illustrates a modification of the control of positioning and guidance means at a distance from the lid by means of which contact between the roller blind web and the rear roof edge is prevented from the beginning.

In the case of the device 10a, carriages 32a are displaced automatically into an intermediate position along guide rails 34a as soon as the lock mechanism 42a is activated. Since a tension bar 26a thus comes closer to the vehicle opening, which is exposed by the vehicle lid 14a, contact between the obliquely positioned roller blind web 22a and the roof area can be reliably prevented through a suitable choice of the intermediate position, as illustrated in FIG. 3.

Finally, FIG. 4 illustrates a further modified device 10b in which contact with an obliquely positioned roller blind web 22b is reliably prevented, regardless of the position of carriages 32b along guide rails 34b.

With this device 10b, the guide rails 34b are designed so that they guide the side edges of the roller blind web 22b in a part of their longitudinal extent at a distance from the trunk, whereas the roller blind web 22b can be pivoted out of the respective (horizontal) plane, as in the embodiments described above, in a portion of the longitudinal extent of the guidance close to the trunk which is spanned by the two guide rails 32b. As a result, contact between the roller blind web 22b and the roof area is again reliably prevented.

The invention claimed is:

1. A device for covering a cargo space of a motor vehicle which is bordered by an outwardly pivotable vehicle lid, comprising an extractable roller blind device which can be driven at least in the retraction direction and forms in its extracted state a roller blind web that extends in a flat web between a first end of the roller blind and a second end of the roller blind and first positioning assembly comprising a pair of carriages and guide rails and second positioning assembly comprising a holder arranged in the vehicle for positioning the first and second ends respectively of the roller blind in of which the roller blind web can be extracted into a covering position in which the roller blind web extends essentially horizontally over the cargo space, and wherein the first positioning assembly is arranged separately from the vehicle lid and the second positioning assembly is arranged on the vehicle lid, wherein the second end of the roller blind is jointly pivotable by the outward pivoting of the vehicle lid to bring the roller blind web out of the covering position and into an oblique position.

2. The device of claim 1, wherein the plane of extent of the roller blind web in the covering position is arranged parallel to a pivot axis (A) about which the vehicle lid pivots.

3. The device of claim 1, wherein the two ends of the roller blind have a joint direction of extent and this direction of extent is provided to run parallel to a pivot axis (A) about which the vehicle lid pivots.

4. The device of claim 1, wherein the second positioning assembly is integrated into the vehicle lid.

5. The device of claim 1 wherein the second positioning assembly is provided directly between an outer skin and an inside panel of the vehicle lid so that the inside panel at least partially covers the second positioning assembly.

6. The device of claim 1, wherein the first positioning assembly guide rails extend in a longitudinal direction for accommodating lateral end pieces of the first end of the roller blind in such a way that they are longitudinally transportable.

7. The device of claim 6, wherein the carriage can be driven to be longitudinally transportable and to which the side end pieces of the first end of the roller blind are connected.

8. The device of claim 6, wherein the guide rails are designed over a portion of their extent in the longitudinal direction which is at a distance from the vehicle lid to guide the lateral edges of the roller blind web.

9. The device of claim 7, wherein the carriages are driven automatically into an intermediate position along the guide rails as soon as a lock mechanism for opening the trunk lid is activated.

10. The device of claim 5 wherein the second assembly comprises a roller rotatably mounted within the vehicle lid.

11. The device of claim 5 wherein the inside panel has a slot, and the roller blind web extends through the slot.

12. The device of claim 9 wherein in the intermediate position, a portion of the roller blind web extends parallel to the guide rails, and another portion of the roller blind web extends at an angle relative to the guide rails as it extends upward toward the vehicle lid from the guide rails.

13. The device of claim 1 wherein the roller blind web is secured on the device so that the roller blind web moves rearward toward the vehicle lid to uncover the cargo space.

14. A device for covering a cargo space of a motor vehicle which is bordered by an outwardly pivotable vehicle lid, comprising
an extractable roller blind device which can be driven at least in the retraction direction and forms in its extracted state a roller blind web that extends in a flat web;
a pair of opposing guide rails extending longitudinally along the cargo space; and
a roller mounted on the vehicle lid,
wherein the roller blind web has one end attached to the roller and another end attached to the guide rails.

* * * * *